Sept. 23, 1969 D. T. BEST 3,469,248

DUAL-TRANSFER MAGNETIC FILM SHIFT REGISTER

Filed June 23, 1966

INVENTOR
DONALD T. BEST

BY Rene A. Kuypers

ATTORNEY 3,469,248
DUAL-TRANSFER MAGNETIC FILM SHIFT REGISTER

Donald T. Best, Plymouth Meeting, Pa., assignor to Sperry Rand Corporation, New York, N.Y., a corporation of Delaware Filed June 23, 1966, Ser. No. 559,998
Int. Cl. G11b *5/74*
U.S. Cl. 340—174 8 Claims

ABSTRACT OF THE DISCLOSURE

An invention is disclosed for a magnetic shift register wherein flux gain is obtained in the transfer loop coupling the memory locations. The flux gain is obtained during information transfer since any memory element is driven by the output from two cascaded memory elements.

This invention relates in general to an information shift register. In particular, this invention relates to a shift register which provides flux gain in the transfer loop.

One of the principle difficulties in previously known attempts to make an information film shift register embodying the principle of bit steering has been that the impedance of the transfer loop, which magnetically connects one bit to another bit, is relatively large. By way of summary, information transfer by bit current steering comprises the technique of developing in the transfer loop a bit current during the read out of a first memory element which steers the remanent magnetization of a second memory element, which has been biased, in the same direction as the first memory element. Thus, the information stored in the first memory location is effectively transferred to the second memory location. However, when the impedance of the transfer loop is relatively high, the steering current which is developed for an information transfer becomes somewhat critical. The reason for this criticality results from the fact that if the steering current is of insufficient magnitude, information in the second location cannot be switched and hence, a shift register operating in the bit steering mode will not operate properly.

Therefore, it is an object of this invention to provide a new and improved information transfer arrangement; it is yet another object of this invention to provide a new and improved thin film shift register; it is still another object of this invention to provide a new and improved magnetic thin film shift register which is reliable in operation; it is another object of this invention to provide an information transfer arrangement which provides flux gain in the transfer loop.

Figure 1:
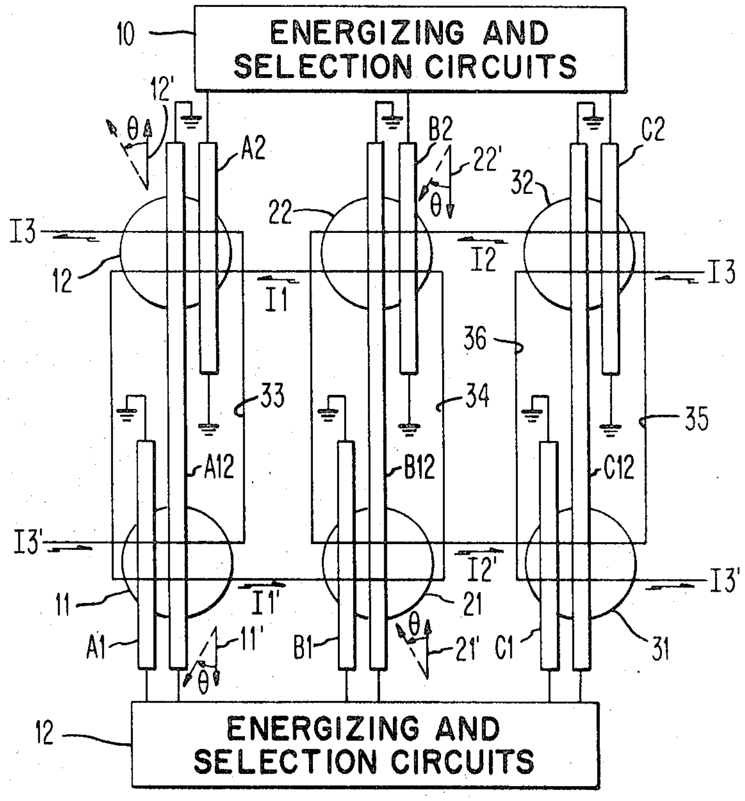
Figure 2:
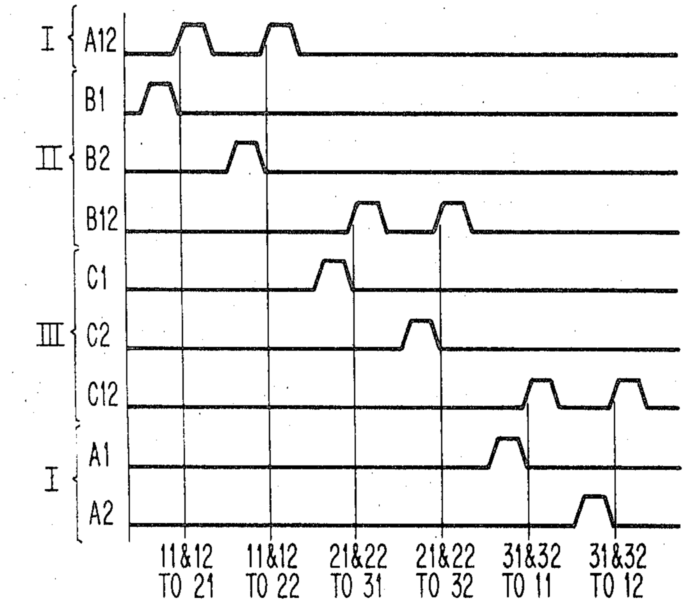

Other objects of this invention will become apparent to those of ordinary skill in the art by reference to the following detailed description of the exemplary embodiments of the apparatus and the appended claims. The various features of the exemplary embodiments according to the invention, may be thus understood with reference to the accompanying drawings, wherein:

FIGURE 1 depicts the information transfer arrangement in accordance with this invention. FIGURE 2 depicts the timing pulses that are utilized with the arrangement of FIGURE 1.

Referring now in greater detail to FIGURE 1, there is depicted a plurality of memory elements 11, 12, 21, 22, 31 and 32. The memory elements 11 to 32 comprise magnetic elements having the property of uniaxial anisotropy. Such memory elements include, for example, mated films, planar thin films, and plated magnetizable wires. The memory element 11 to 32, however, must operate in the non-destructive mode for reasons which will become apparent hereinafter.

By way of example and for descriptive purposes only, the memory elements 11–32 will be considered as planar films. The planar films 11–32 are conventionally magnetizable thin films which are approximately three thousand to twelve thousand angstroms thick and deposited on a conductive ground plane (not shown). The films are conventionally made of Permalloy (80% nickel and 20% iron) and are deposited on the ground plane by either vacuum deposition or electroplating in the presence of a D.C. field. The resultant film element thereby exhibits a uniaxial magnetic anisotropy. The magnetic anisotropy is the preference of the magnetic moments of the film for a direction or set of directions normally refered to as the easy axis of magnetization. The 90 degree position removed from the easy axis of magnetization is designated as the hard axis of magnetization. The easy axes 11′, 12′, 21′ and 22′ are shown outside its associated memory element 11, 12, 21 and 22.

The plurality of memory elements 11, 12, 21, 22, 31 and 32 of FIGURE 1 are divided into groups of two memory elements each. Thus, the memory elements 11 and 12 form a first group, the memory elements 21 and 22 form a second group and the memory elements 31 and 32 form a third group. The drive straps A12, B12 and C12 are connected at one end to the energizing and selection circuits 12 and at the other end to ground thereby providing a complete circuit for the drive current. The drive strap A12 is oriented along the respective easy axis of the films 11 and 12 which form one group. In like manner, the straps B12 and C12 are oriented along the respective easy axis of the films 21, 22 of the second group and the respective easy axis 31, 32 of the third group. In a planar film arrangement, the straps A12, B12 and C12 are conventionally deposited by evaporation or by etched wiring. The straps A12, B12 and C12 provide a path for magnetic coupling to the memory elements of a respective group. The purpose of this magnetic coupling will be clearer hereinafter.

Individual straps are oriented along the easy axis of the respective films 11, 12, 21, 22, 31 and 32. The straps A1, B1 and C1 are shown as being connected at one to the energizing and selection circuits 12 and at their other end to ground to provide a complete circuit for the drive current. In like manner, the straps A2, B2 and C2 are shown connected at one end to the energizing and selection circuits 10 and at their other end to ground. The individual straps A1, A2, B1, B2, C1 and C2 also provide a path for magnetic coupling to their associated thin film element.

The conductors 33, 34, 35 and 36 provide coupling between all of the memory elements comprising two groups. The conductors 33, 34, 35 and 36 will be referred to hereinafter as transfer loops. By way of example, the transfer loop 34 is shown as coupling the memory elements 11 and 12 of one group with the memory element 21 and 22 of a second group. In like manner, the transfer loop 35 couples the memory elements 21 and 22 of the second group with the memory elements 31 and 32 of the third group. It should be noted that for the three groups of memory elements shown, transfer loops 34 and 35 overlap the second group composed of memory elements 21 and 22. The transfer loop 33 is shown as being juxtaposed to the memory elements 11 and 12 of the first group and to the other elements of a group (not shown). In like manner, the transfer loop 36 is shown as being juxtaposed to the elements 31 and 32 of the first group and to the other elements of a group group which are not shown. In actual practice, the transfer loops 33 and 36 may be the same transfer loop so that the first and third groups are coupled to one another.

In an actual embodiment, the drive straps are wide copper busses approximately 20 mils wide, whereas the transfer loops have a much narrower dimension. Also in a mated film arrangement, a matching film spot would be positioned over the various busses to provide a nearly complete magnetic closure.

The information transfer device of the instant invention requires that a single information bit (i.e., a binary "0" or "1" be stored in the two memory elements comprising a group. By way of example, a "0" or "1" bit is stored in the group composed of the memory elements 11 and 12. This is accomplished by magnetizing the memory element 11 oppositely from that of the memory element 12. To store a "1" bit, for example, the memory element 12 is magnetized along the easy axis 12′ so that the magnetization vectors along the easy axis 12 are oriented in an upward direction as viewed from the bottom of the drawing. In order to complete the storing of a "1" bit, the magnetization vectors along the easy axis 11′ of the memory element 11 are oriented in a downward direction and therefore oppositely from the magnetization of the memory element 12. A "0" bit is stored in the memory elements 11 and 12 in just the opposite manner from that described for the storing of a "1," namely, the magnetization vectors of the memory element 11 are oriented upwardly and the magnetization vectors of the memory element 12 are oriented downwardly along their respective easy axis.

Let us assume that a "1" is stored in the bit location comprising the memory elements 11 and 12 and accordingly, the magnetization vectors along the easy axes 11 and 13 are oriented as shown on the drawing. In accordance with this invention, the "1" information bit stored in the group comprising the memory elements 11 and 12 may be readily transferred to the next adjacent bit group composed of the memory elements 21 and 22. The binary information is transferred in the following manner.

The information stored in locations 11 and 12 is first transferred to location 21. Thus, the drive strap B1 is energized by the selection circuit 12 (FIG. 2). A current is conducted in the strap B1 to ground which causes the magnetization vectors oriented along the easy axis 21′ to be rotated to some angle less than 90 degrees therefrom. This orientation of the magnetization vectors to some angle less than 90 degrees is designated as the bias condition. While the magnetization vectors of the memory element 21 are thus biased, the strap A12 is energized by the selection circuit 12 thereby causing a current to flow therethrough to ground. The energizing of the strap A12 causes the magnetization vectors along the easy axes 11′ and 12′ of memory elements 11 and 12, respectively, to be simultaneously rotated to an angle less than 90 degrees. The rotation of these magnetization vectors induce respective voltages in the transfer loop 34 and cause a current to flow therein. Thus, the rotation of the magnetization vectors of the memory element 12 induces a voltage in the transfer loop 34 which causes the current I1 to flow in the direction shown. The current I1 flows from right to left in accordance with Lenz's Law. Thus, the current I1 opposes the reduction of flux in the upward direction (as viewed from the bottom of the drawing) by the vectors rotation in a counterclockwise direction. In like manner, the rotation of the magnetization vectors of the memory element 11 induces a voltage in the transfer loop 34 and causes the current I1′ to flow. The current I1′ flows in the direction shown since there is a reduction of flux in the downward direction by the vectors rotation in a clockwise direction and the induced current I1′ opposes this reduction of flux.

The transfer loop 34 provides a conductive path for the currents I1 and I1′ (hereinafter referred to as the steering current) and since I1 is approximately equal to I1′, the total steering current generated is 2I1. The relative position of the current pulse applied to the strap A12 with respect to the bias current pulse applied to the strap B1 is shown in FIGURE 2. From the drawing it is apparent that the rise time of the current pulse applied to the strap A12 is substantially coincident with the fall time of the current pulse applied to strap B1 although the fall time of the pulse applied to B1 may be permitted to extend some time after the rise of the current applied to A12, since the transfer process is nondestructive.

The reason for this timing relationship between the current pulses applied to straps A12 and B1 is that while the vectors of memory element 21 are still biased and just before they return to the quiescent position along the easy axis, the steering current 2I1 generated by the A12 current pulse is applied. This steering current 2I1 tips the magnetization vectors of the memory element 21 so that they assume an orientation exactly similar to the magnetization vectors of the memory element 11. Therefore, assuming that the magnetization vectors of the memory element 21 were oriented upwardly, the steering current 2I1 tips the vectors through the hard axis so that the vectors assume a downward orientation. On the other hand, if the magnetization vectors of the memory element 21 were previously magnetized in a downward direction, the steering current 2I1 would merely tip the vectors back in the same direction and consequently, the information is re-written.

During this transfer, no action is occurring at the memory element 22 since no current pulses are applied to any of the straps linking this element, therefore, this element presents only a low impedance to the current flow.

Summarizing therefore the first step of the information transfer of the instant invention, the memory location 21 is biased after which the information stored in the memory elements 11 and 12 is simultaneously read out. The simultaneous read out of the memory elements 11 and 12 generates a steering current which flows in a transfer loop 34 which couples to the four memory elements of two consecutive groups. The transfer loop provides a conductive path for the steering current which enables the information stored in one of the memory elements of a first group (memory element 11) to be transferred to one of the memory element of a second group (memory element 21). No action occurs in the remaining memory element 22 of the second group since this element is in the unbiased state when the steering current is flowing in the transfer loop.

The information stored in the memory locations 11 and 12 is next transferred to the memory location 22. This is accomplished in a similar manner to that previously described. Thus, the strap conductor B2 is energized by means of the energizing and selection circuit 10 which causes a current pulse (FIG. 2) flow therethrough to ground. The energizing of the strap B2 causes the magnetization vectors oriented along the easy axis 22′ to be rotated to some angle less than 90 degrees (the bias condition). While the magnetization vectors of the memory element 22 are biased, the strap conductor A12 is energized by a current pulse (FIG. 2) via the selection circuit 12. Accordingly, the information stored in the memory elements 11 and 12 are simultaneously read out thereby again inducing voltages in the transfer loop 34 and causing the respective steering currents I1 and I1′ (2I1) to flow. As discussed above, this current flows in the direction shown as a result of Lenz's Law. Therefore, the steering current causes the magnetization vectors of the memory element 22 (assuming that they are originally oriented downwardly) to be rotated so that when they return to the quiescent condition they assume an upward direction. In the event that the magnetization vectors had been already oriented in an upward direction the steering current 2I1 would merely cause the same information to be rerecorded in the memory element 22. Therefore, the memory element 22 assumes the same magnetization along the easy axis as the vectors of the memory element 12.

Summarizing therefore the second step of the information transfer, the information stored in the memory element 12 is transferred to the memory element 22 by first biasing the latter and then simultaneously reading out the information stored in the memory elements 11 and 12. The simultaneous read out of memory elements 11 and 12 generates the steering current in the transfer loop 34 so that the magnetization vectors along the easy axis 22' are stored in the same direction as those along the axis 12'. No action occurs at memory element 21 since this element remains in the unbiased state when the steering current is flowing in the transfer loop 34.

From the above discussion it is apparent that the binary information stored in a first location represented by the memory elements 11 and 12 may be readily transferred to a second location represented by the memory elements 21 and 22.

Information may also be transferred from the second memory group to the third memory group. This information transfer is the same as that previously described and may be summarized as follows: The memory element 31 is biased to the less than 90 degree position by energizing the strap C1 by mean of the selection circuits 12. While the magnetization vectors of the memory element 31 are in a biased condition, the information stored in the memory elements 21 and 22 are simultaneously read out by energizing the strap B12 by means of the selection circuit 12. This causes the steering current 12 and 12' to be generated in the transfer loop 35. Accordingly, the information in the memory elements 21 and 22 is transferred to the memory elements 31.

The information stored in the memory elements 21 and 22 is next transferred to the memory element 32 by first biasing this element by means of the conductor C2. Conductor C2 is energized by the selection circuit 10 which causes current to flow to ground. While the magnetization vectors of the memory element 32 are thus biased, the conductor B12 is energized thereby causing the currents I2 and I2' to again flow in the transfer loop 38. Accordingly, the information stored in the memory elements 21 and 22 is transferred to the memory element 32. The timing relationship between the signals applied to the conductors C1, C2 and B12 is shown in FIGURE 2.

It should be readily apparent that the information stored in the memory elements 31 and 32 may be transferred by means of transfer loop 36 to a next adjacent pair of memory elements which are not shown. In addition, the information stored in a particular group may be transferred back to the memory elements 11 and 12 via the straps 33 and 36 which are in such an arrangement the same transfer loop.

By referring again to FIGURE 2, it may be seen that the propagation of information along the shift register requires certain precise timing. In an actual embodiment therefore, the energizing and selection circuits 10 and 12 are timing circuits which provide a three phase clock signal. For the sake of convenience, the three phases of the clock signal are designated as phase A, B, and C. Phase C of the clock pulse, for example, generates the four signals shown in FIGURE 2, namely, C1, C2 and the two C12 signals.

As was previously discussed, the transfer loops 33, 34, 35 and 36 may in actual practice have a relatively high impedance characteristic which prevents sufficient steering current from being generated from a single memory element to another. However, the instant invention overcomes this difficulty by providing flux gain in the transfer loop since, in effect, any memory element is driven by the output from two cascaded memory elements. This may be better appreciated from the following discussion. Suppose the transfer loop has a low impedance, then the inductive load represented by one memory element requires only a small steering or tipping current when a memory element is in the biased condition in order to change its magnetization. However, the steering current developed by the read out of two memory elements is greater than that needed to provide the steering current for a single memory element and hence, there could be a fan out of this steering current to other memory locations if needed. The ability to have fan out indicates that there is flux gain in the transfer loop. This is a significant feature of the invention when the transfer loop has a relatively high impedance. Accordingly, an information transfer arrangement utilizing the flux gain developed in the transfer loop is relatively reliable since sufficient steering current is always generated. Hence, the operation of a shift register is not critical.

Although the subject invention has been described by utilizing the read out of two memory elements to provide a steering current to write or transfer information into a single element, it should be understood that the invention could be readily adapted by those skilled in the art to utilize more than two memory elements for additional flux gain and fan out to a number of elements.

It was previously mentioned that the subject invention is based on the fact that the memory elements 11 to 32 is non-destructively read out. In view of the above discussion the reason for this should be readily apparent. Thus, since each group of memory elements must be read out twice to transfer information into the individual memory elements of the next group, it is necessary that the read out be non-destructive. If this were not the case, information could only be transferred into one memory element of a group.

In summary, this invention relates to an information transfer device wherein binary information which is stored in two memory locations is transferred into two other memory locations, one at a time. Since two locations always drive one location, there is enough flux gain to provide more than enough current to make the transfer.

Obviously many modifications and variations of the present invention are possible in the light of the above teachings. It is therefore to be understood that within the scope of the appended claims, the invention may be practiced otherwise than specifically described.

The embodiments of the invention in which an exclusive property or privilege is claimed are defined as follows:

1. The combination comprising:

(a) a plurality of memory elements, each said memory element having a substantially rectangular hysteresis loop, said memory elements being arranged into groups of at least two memory elements, such that said at least two memory elements store a single information bit;

(b) a plurality of first coupling means juxtaposed to said plurality of memory elements, each different one of said first coupling means being arranged so that it is juxtaposed to all of the memory elements of two different groups;

(c) a plurality of second coupling means, each different one of said second coupling means being juxtaposed to a different one of said plurality of memory elements, each said second coupling means adapted to be connected to an energizing means;

(d) a plurality of third coupling means, each different one of said third coupling means being juxtaposed to the memory elements comprising a respective different group; said third coupling means being arranged with respect to said memory elements of said respective group to generate a steering current in said first coupling means which is twice the current that is generated by a single memory element.

2. The combination in accordance with claim 1 wherein any two adjacent first coupling means commonly couple to all of the memory elements of one of said groups.

3. The combination in accordance with claim 1 wherein said memory element comprises a thin film element having an easy axis of magnetization.

4. The combination in accordance with claim 3 wherein said memory element operates in the non-destructive read out mode.

5. The combination in accordance with claim 1 wherein information is transferred from one of said memory element of a first group to one of said memory elements of a second group by biasing said one memory element of said second group by means of its juxtaposed second coupling means and energizing the third coupling means juxtaposed to the memory elements of said first group.

6. The combination in accordance with claim 5 wherein the energizing of said third coupling means causes a steering current to flow in said first coupling means in a direction to transfer the information in said one memory element of said first group to said memory element of said second group.

7. The combination in accordance with claim 5 wherein information is transferred from the other of said memory elements of said first group to the other of said memory elements of said second group by biasing said other memory element of said second group by means of its juxtaposed second coupling means and energizing the third coupling means juxtaposed to the memory elements of said first group, said information stored in said first memory group being effectively transferred to said second memory group.

8. The combination in accordance with claim 7 wherein the energizing of said third coupling means causes a steering current to flow in said first coupling means in a direction to transfer the information in said other memory element of said first group to said other memory element of said second group.

References Cited

UNITED STATES PATENTS

| | | | |
|---|---|---|---|
| 3,195,117 | 7/1965 | Englebart | 340—174 |
| 3,344,415 | 9/1967 | Briggs | 340—174 |
| 3,357,000 | 12/1967 | Tickle | 340—174 |

BERNARD KONICK, Primary Examiner

BARRY L. HALEY, Assistant Examiner